(12) United States Patent
Roy

(10) Patent No.: US 9,603,297 B2
(45) Date of Patent: Mar. 28, 2017

(54) REMOTE STEERING CONTROL WITH ROW FINDER

(71) Applicant: Michael J. Roy, Tieton, WA (US)

(72) Inventor: Michael J. Roy, Tieton, WA (US)

(73) Assignee: BLUELINE MFG. CO., Moxee, WA (US)

( * ) Notice: Subject to any disclaimer, the term of this patent is extended or adjusted under 35 U.S.C. 154(b) by 0 days.

(21) Appl. No.: 14/884,667

(22) Filed: Oct. 15, 2015

(65) Prior Publication Data

US 2016/0106023 A1    Apr. 21, 2016

Related U.S. Application Data

(60) Provisional application No. 62/064,398, filed on Oct. 15, 2014.

(51) Int. Cl.

| | |
|---|---|
| *A01B 69/00* | (2006.01) |
| *G05D 1/02* | (2006.01) |
| *G05D 1/00* | (2006.01) |

(52) U.S. Cl.
CPC ............ *A01B 69/00* (2013.01); *G05D 1/0011* (2013.01); *G05D 1/021* (2013.01); *G05D 2201/0201* (2013.01)

(58) Field of Classification Search
CPC ....... A01B 69/00; G05D 1/0011; G05D 1/021
USPC ....................................................... 701/2, 50
See application file for complete search history.

(56) References Cited

U.S. PATENT DOCUMENTS

| 2,465,660 | A | * | 3/1949 | Phillips | B62D 1/26 |
| | | | | | 104/244.1 |
| 3,395,771 | A | * | 8/1968 | Swanson | A01B 69/00 |
| | | | | | 180/401 |
| 3,548,966 | A | * | 12/1970 | Blacket | A01B 69/008 |
| | | | | | 104/244.1 |
| 3,765,501 | A | * | 10/1973 | Burvee | A01B 69/00 |
| | | | | | 104/244.1 |
| 4,298,084 | A | * | 11/1981 | Newell | A01B 69/008 |
| | | | | | 104/244.1 |
| 4,367,802 | A | * | 1/1983 | Stiff | B62D 1/26 |
| | | | | | 104/244.1 |
| 4,607,716 | A | * | 8/1986 | Beck | B62D 1/26 |
| | | | | | 104/244.1 |
| 4,616,712 | A | * | 10/1986 | Jorgensen | A01B 69/004 |
| | | | | | 104/244.1 |
| 5,103,924 | A | * | 4/1992 | Walker | A01B 69/005 |
| | | | | | 104/244.1 |

(Continued)

*Primary Examiner* — Tyler J Lee
(74) *Attorney, Agent, or Firm* — Svendsen Legal, LLC.

(57) ABSTRACT

A remote steering control and row finder, used with a tractor towing a vehicle or trailer. The remote steering control that can be retrofit to a conventional tractor and towed vehicle, and includes self-guiding features for finding a row of crops to maintain a center steer. The remote tractor includes a guide arm with an arm extension having a pivot tab proximate to a pivot block on the arm extension. The pivot block hinges about the arm extension at a block hinge. A pivot switch mounts to the arm extension, activated by the rotation of the pivot tab on the pivoting of the pivot block about the guide hinge. With the opening and closing of the pivot switch, either a hard-wired or a wireless remote console on the towed vehicle controls the steering mechanism of the remote tractor, guiding the direction of travel of the remote tractor.

6 Claims, 5 Drawing Sheets

(56) References Cited

U.S. PATENT DOCUMENTS 8,359,141 B1 * 1/2013 Lange ............... G01C 21/20
172/2
9,271,439 B2 * 3/2016 Bourgault ........... A01C 21/005

* cited by examiner

REMOTE STEERING CONTROL WITH ROW FINDER

TECHNICAL FIELD

This invention pertains to an apparatus and system for a remote steering control and row finder, used with a tractor towing a vehicle. More specifically, the invention relates to a remote steering control that can be retrofit to steer a conventional tractor from the trailer or towed vehicle, and includes self-guiding features for finding a row of crops to maintain a center steer.

BACKGROUND OF THE INVENTION

Tractors are widely employed in farms, orchards and work-sites to tow or otherwise pull a variety of implements, including trailers, lifts, and other vehicles. These conventionally controlled tractors require a driver to steer and maneuver the tractor to track and avoid obstacles, typically through an orchard, vineyard, farm or hop yard, construction site or work site.

The problem of rising labor costs coupled with the unavailability of skilled workers pushes the agricultural industry to develop solutions that often utilize technological improvements to reduce the skilled labor required to accomplish the tasks required to manage and operate a farm or orchard. In the field, it would be beneficial to reduce the number of workers required to operate machinery that typically requires a crew of two or more persons, somehow consolidating and automating required tasks of functions.

The following is a disclosure of the present invention that will be understood by reference to the following detailed description taken in conjunction with the accompanying drawings.

Figure 1:
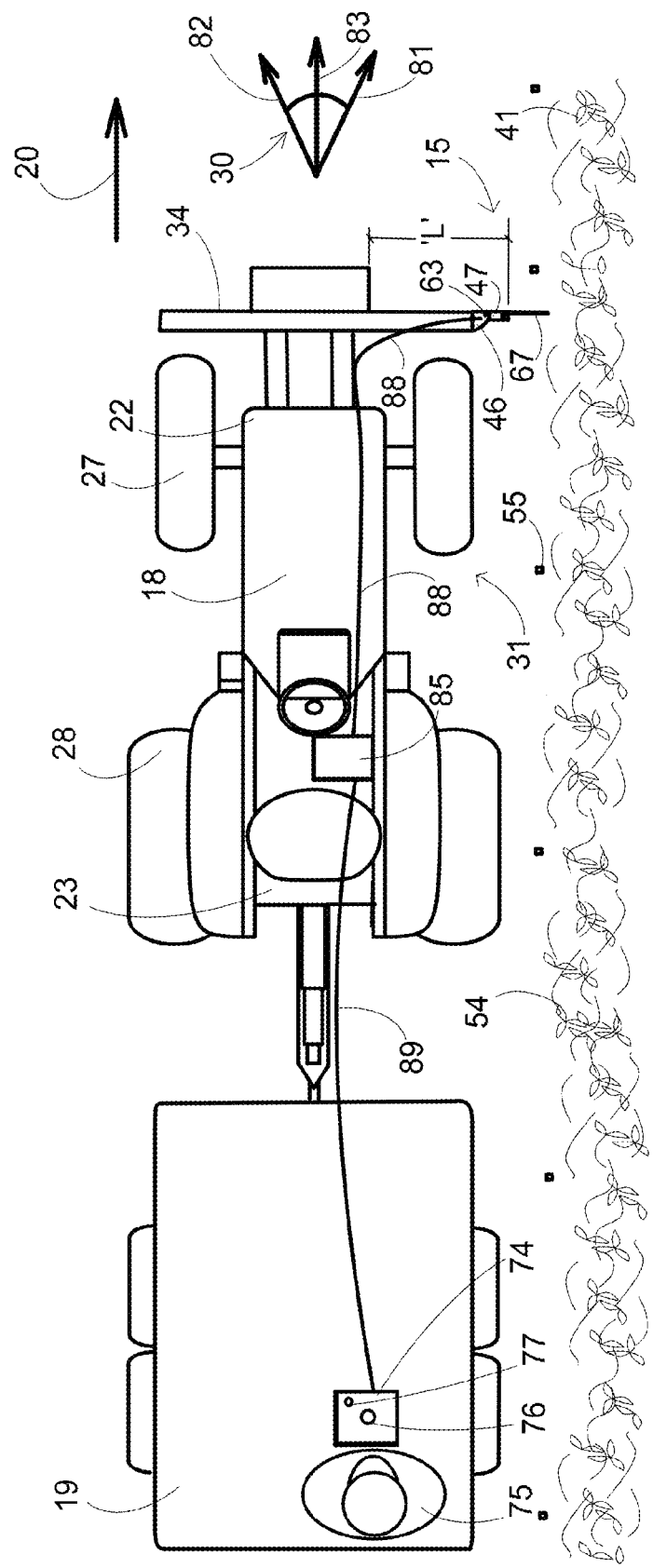
FIG. 1 is a top view of a remote steering control with a row finder, according to an embodiment of the invention.

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and may include fragmentary views, graphic symbols, diagrammatic or schematic representations, and phantom lines. Details that are not necessary for an understanding of the present invention by one skilled in the technology of the invention, or render other details difficult to perceive, may have been omitted.

DETAILED DESCRIPTION OF SPECIFIC EMBODIMENTS

The present invention provides a remote steering control with a row finder, for use in a remote controlled towing vehicle or tractor. FIGS. 1 through 5 show preferred embodiments of a remote steering control with row finder apparatus 15, which can be referred to simply herein as the remote steering apparatus, with FIG. 1 schematically showing a top view of the remote steering apparatus.

The remote steering apparatus 15 includes a remote tractor 18 hitched or otherwise connected to a towed vehicle 19. Preferably, the remote tractor pulls the towed vehicle in a forward motion 20, as shown in FIG. 1. The remote tractor, which simply may be referred to as a tractor, includes a frontward end 22 and a rearward end 23, with front wheels 27 proximate to the front end, and rear wheels 28 proximate to the rearward end.

Of note, the terms "proximate to" or "approximately" are employed herein throughout, including this detailed description and the attached claims, with the understanding that is denotes a level of exactitude or equivalence in amount or location commensurate with the skill and precision typical for the particular field of endeavor, as applicable.

Figure 3:
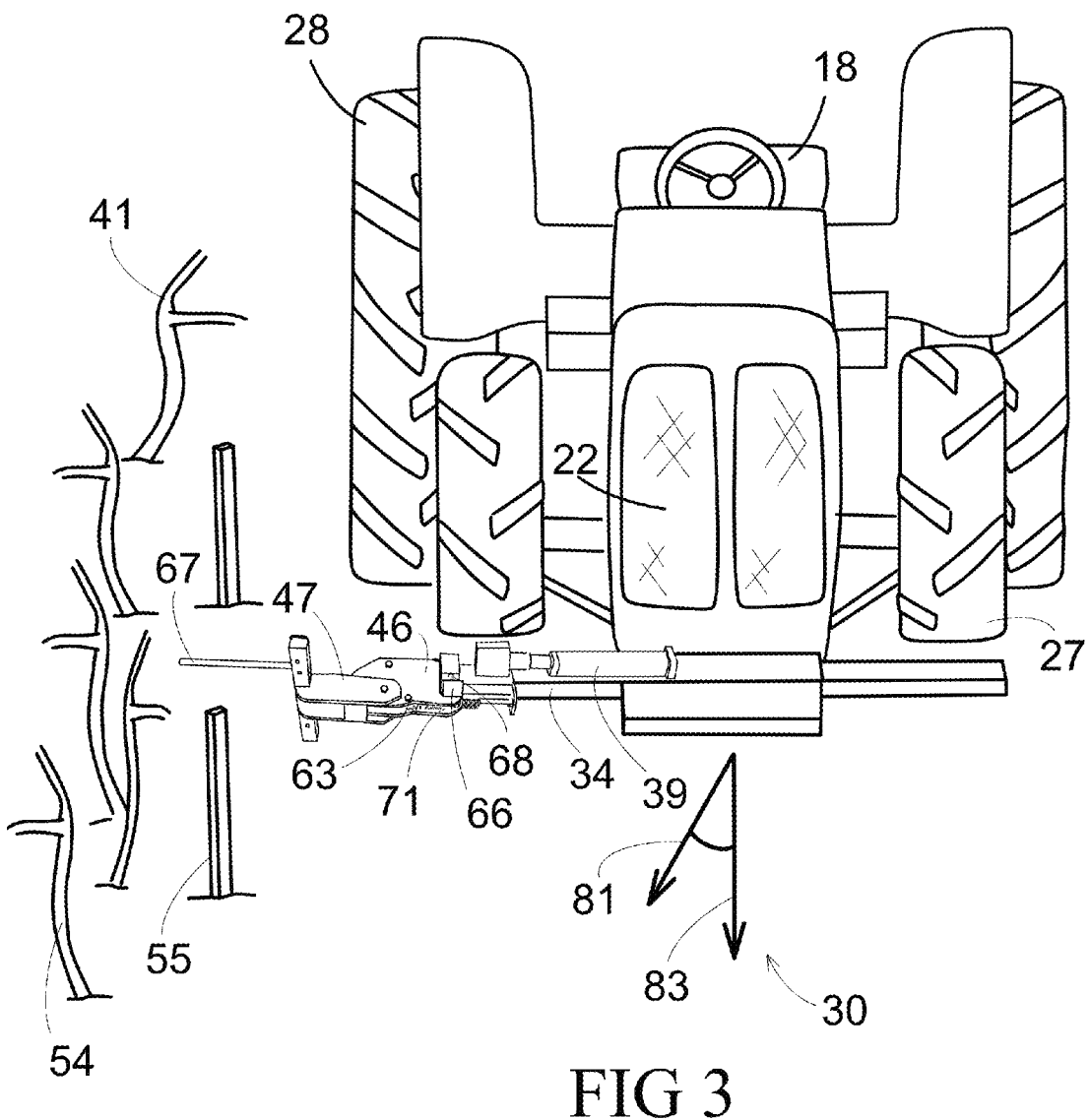
FIG. 3 is a frontward end view of the remote steering control with a row finder, according to an embodiment of the invention.

Preferably, as is typical in conventional tractors, rotational power is supplied to the rear wheels 28 of the remote tractor 18, with the front wheels 27 of the remote tractor turn as needed for steering and changing a direction of travel 30. The direction of travel is laterally variable, shown as an 'arc' or range of direction in FIG. 1. In the present invention, the remote tractor 18 also includes a steering mechanism 31. The steering mechanism is preferably a conventional, hydraulically assisted system, which turns the front wheels 27 of the remote tractor to change the direction of travel for the remote tractor, as desired. However, for the present invention, the conventional steering mechanism is augmented with additional elements and features, including a guide arm 34 mounted proximate to the front end 26 of the remote tractor, as also shown in FIG. 3.

Figure 2:
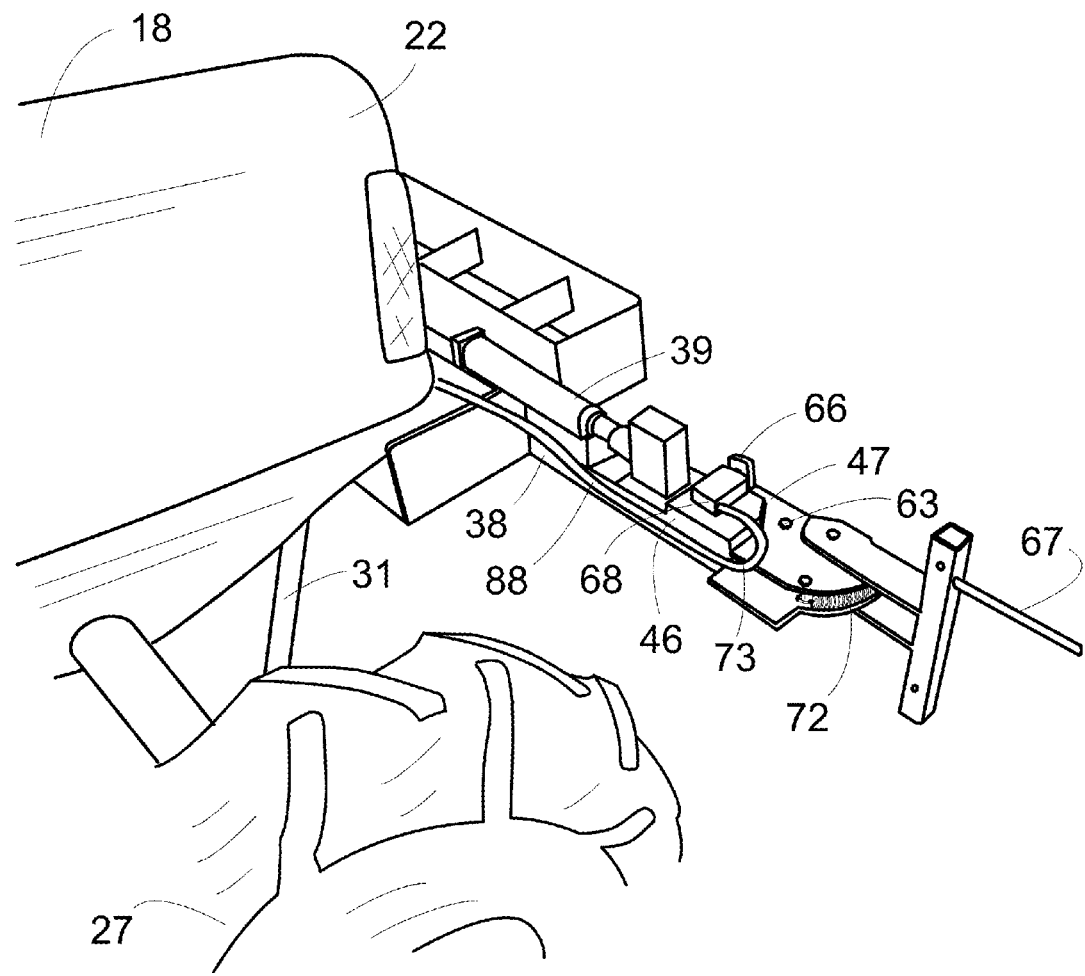
FIG. 2 is a perspective view of the remote steering control with a row finder, according to an embodiment of the invention.

Most preferably, the guide arm 34 has an arm extension 38, as shown in FIG. 2. The arm extension is preferably fabricated in the form of a bar or rod that extends horizontally and away from the remote tractor 18, toward a crop row 41. As shown in FIG. 1, the remote tractor 18 and towed vehicle 19 travel down the crop row, which can be orchard row, vineyard row, farm isle or hop yard row, or alternatively a construction site or work site isle, row or road. The arm extension is adjustable outward and away from the remote tractor to an extension length 'L'. The extension length of the extension arm is variable, to suit the needed row width, or prevent impact of the remote tractor and towed vehicle into a crop barrier 54. The crop barrier can be any crow or tree, vine, wall, post, guide wire or obstacle that edges the crop row, or equivalent structure or growth, or as preferred a row upright 55, as shown in FIGS. 1, 3, 4 and 5.

Figure 4:
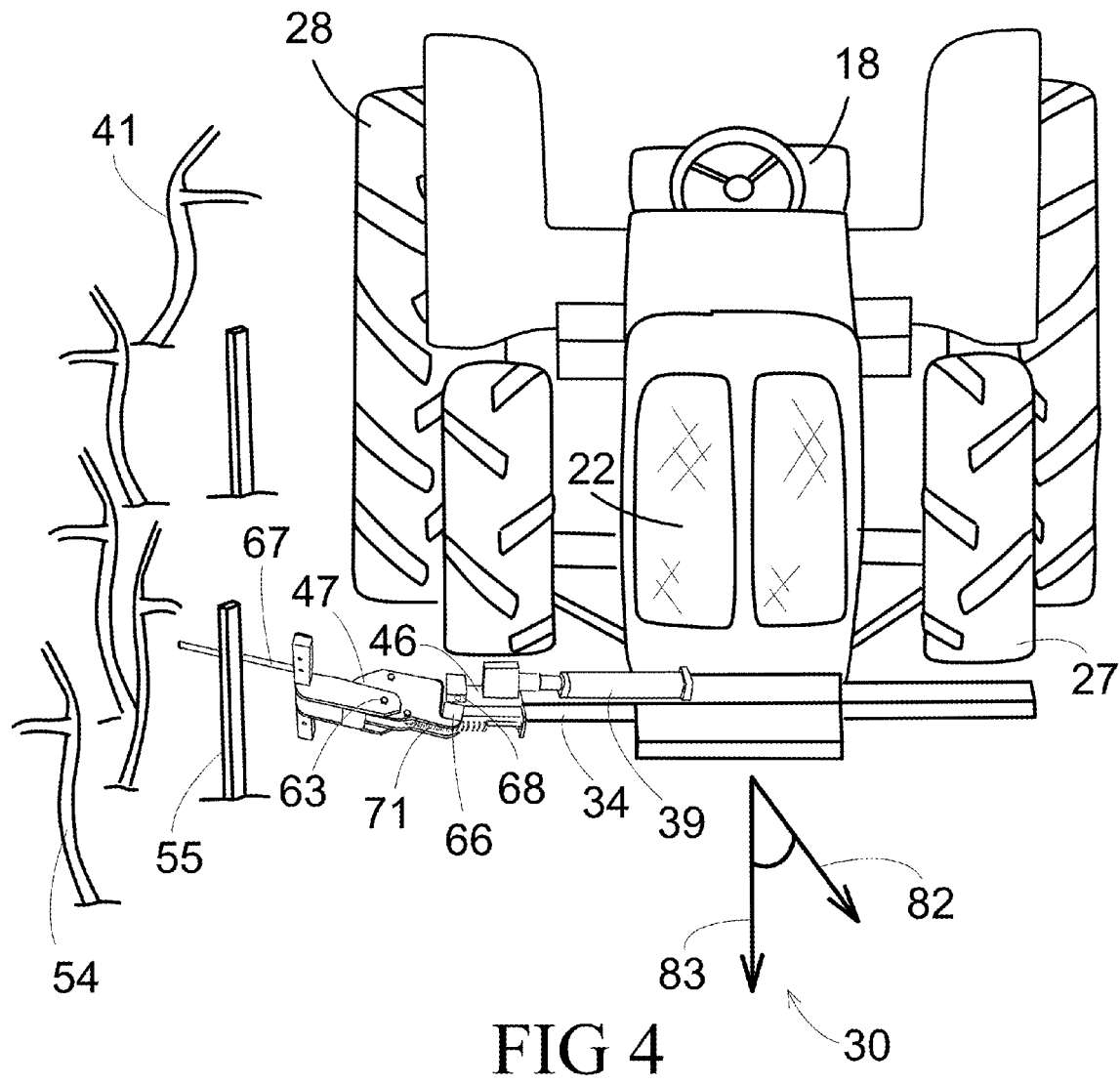
FIG. 4 is a frontward end view of the remote steering control with a row finder, according to an embodiment of the invention.

As shown in FIG. 2, for a most preferred embodiment of the remote steering apparatus 15, a guide block 46 mounts to the arm extension 38 of the guide arm 34 at a guide block hinge 63. The guide block hinge may be referred to simply as a "block hinge." A pivot tab 66 is located proximate to the block hinge on the pivot block. Preferably, the pivot tab protrudes or extends from the pivot block and normally contacts a pivot switch 68 as shown in FIG. 3, and by action of the block hinge, the pivot block hinges about the arm extension away from the pivot switch, as shown in FIG. 4. Most preferably, a row wand 67 is employed as a 'feeler' or a whisker, with the row wand extending from the guide block to physically touch or lightly impact the crop barrier, and thereby cause the pivot block to pivot about the guide block hinge.

To sense and transmit the direction of travel 30 by the remote tractor 18 down the crop row 41, the pivot switch 68 contacts or releases from the pivot tab 66. The pivot switch mounts to the arm extension 38 of the guide arm 34 as shown in FIG. 2. Most preferably, the pivot switch is a conventional, normally open switch that is held in the depressed and closed position by the pivot tab. By the pivoting action of the pivot block 47 about the guide block hinge, the pivot tab rotates away from the pivot switch to releases the pivot switch and open a steering circuit 70. The opening of the steering circuit is sensed electrically and monitored at a remote row finder console 74. The remote row finder console is receivable onto the towed vehicle, and preferably mounted on the towed vehicle and easily accessed by a user 75. With the remote row finder console, the user activates remote steering apparatus 15, which automatically guides the direction of travel 30 and controls the steering mechanism 31 of the remote tractor. Additionally, with the remote row finder console, the user can adjust the extension length 45 of the arm extension 38 inward and outward from the guide arm 34, with an extension control 77, as needed to contact the crop barrier and maintain the direction of travel down the crop row 41 by the remote tractor and the towed vehicle.

Alternatively, the location of the pivot switch 68 and the pivot tab 66 could be swapped, with the pivot switch on the pivot block and the pivot tab located on the guide block. This option would be workable, especially if the pivot switch communicated wirelessly with the remote row finder console 74.

To apply the desired tension upon the pivot switch 68 by the pivot tab 66, a return spring 71 connects the pivot block 47 to the guide block 46, as shown in FIGS. 3 and 4. To counter the force of the return spring, a tension spring 72 preferably connects between the pivot block and the guide block on the opposite side of the guide block, as shown in FIG. 2. The pre-tensioning and opposing interaction of the tension spring with the return spring is selected to provide for a smooth hinging action of the pivot block, while maintaining a light yet constant pressure on the pivot switch, when the pivot block is in its normal operationally closed position, as shown in FIGS. 2 and 3.

With the guide arm 34 on the right hand side of the remote tractor 18, as preferred, the remote tractor is guided slightly to a left direction 81, in its direction of travel 30, as long as the pivot switch 58 is regularly and periodically released by the hinging action of the pivot block 47 as the row wand impact the crop barrier 54, or alternatively the row upright 55. If no impact against the crop barrier or the row upright is sensed, and the guide block fails to regularly pivot, the front wheels 27 of the remote tractor are steered, or drift, incrementally to the right, until the pivot block again hinges by action of the row wand against the crop barrier.

Preferably, the remote steering apparatus 15 of the present invention includes a SmartSteer™ system, as manufactured by Raven Industries, Inc. of Sioux Falls S. Dak., USA. Most preferably, the "Viper Pro" or the "Envisio Pro" brand of Universal SmartSteer Kit is employed (P/N 117-9001-029). A steering control box 85 for the SmartSteer system is shown in FIG. 1, and can be placed in the remote tractor 18. A row finder control cable 88 electrically connects the pivot switch 68 and extension actuator 39 to the steering control box. A steering control cable 89 then electrically connects the steering control box to the remote row finder console 74. The remote row finder console also includes a steering joystick 76, allowing the user to direct the direction of travel 30, as needed to correct and adjust the SmartSteer™ system an input from the pivot switch. Alternatively, a wireless steering system could be used, as known by those skilled in the field of wireless steering control systems employable in agricultural settings.

Specifically, in a preferred method of operation, as the remote tractor 18 with towed vehicle 19 equipped with the remote steering system travels in the forward motion 20 down a crop row 41, the tractor preferably has a slight pre-set turning drift to a right direction 81 or toward the crop row, as shown in FIG. 1. This normal travel of the remote tractor is a straight and forward direction 83. As shown in FIG. 3, the tractor is proceeding in the straight and forward direction, with the pre-set slight inward drift or right direction steer, toward the crop row.

As shown in FIG. 4, when the row wand 67 impacts the row upright 55, the pivot block 47 rotates on the guide block hinge 63. This rotating action of the pivot block on the guide block hinge moves the pivot tab 66, which extends from the pivot block to pivot away from and releases the pivot switch 68, as the pivot block rotates. A preferred pivot switch is a "PREVENTA" brand of limit switch, specifically a miniature design, type "XCS-M," (P/N XCSM4110L1 or alternatively P/N XCSM4110LZ, with a metal end-plunger, as manufactured by Schneider Electric of St.Louis, Mo., USA.

Most preferably, the release of the pivot switch 68 by the pivot tab 66 creates an open electrical steering circuit 73 in the left turn steering guidance in the SmartSteer™ system of the steering control box 85. The steering circuit is part of the row finder control cable 88, as shown in FIG. 2. The open circuit in the SmartSteer system responds by steering the remote tractor 18 in a left direction 82, or away from the row crop, as shown in FIG. 4. This electrical modification to the basic steering control system would be similar for any make or manufacture of steering control systems, as modifiable by a person skilled in the field of steering system technologies. Specially, for the SmartSteer™ system listed above, and utilized in the present invention, the 'H1' and 'H2' circuits on the 'J1' connector bus control the right directional steer and the left directional steer, respectively.

Figure 5:
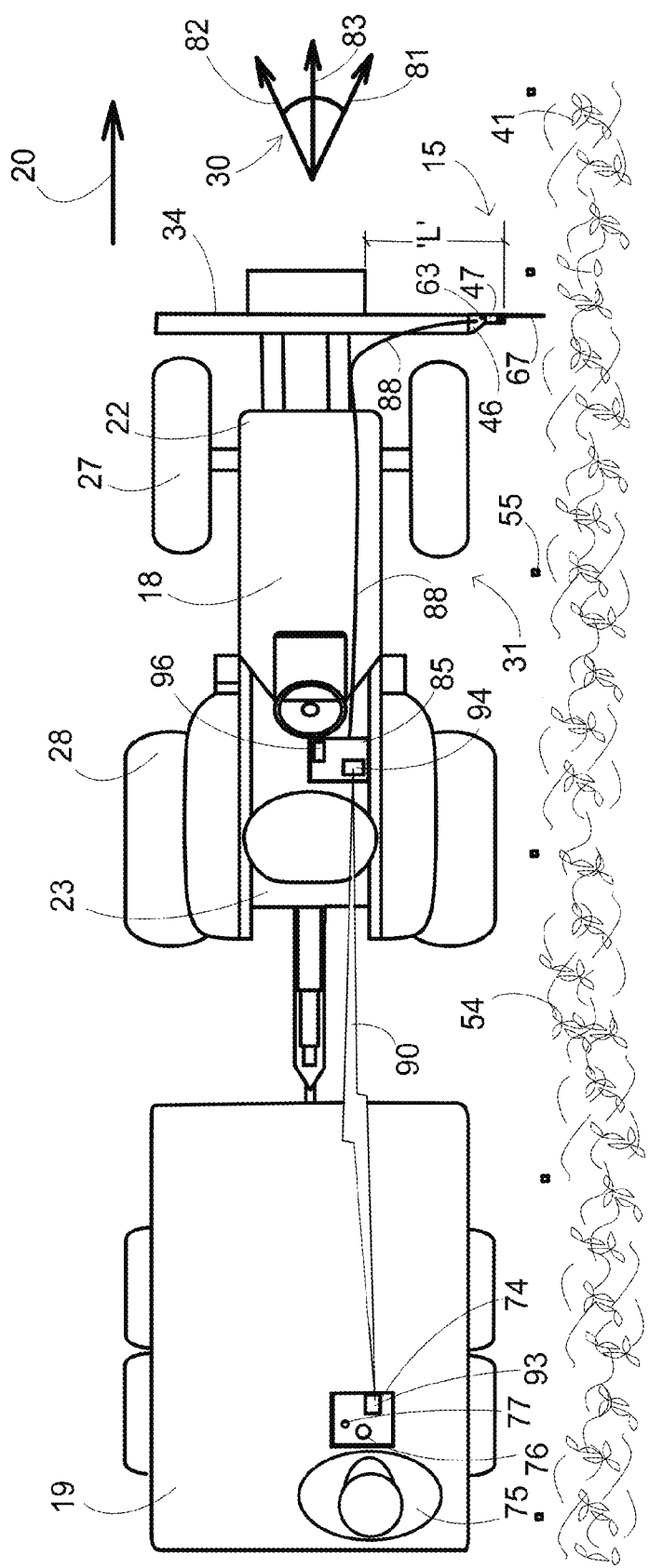
FIG. 5 is a top view of a remote steering control with a row finder, according to an embodiment of the invention.

FIG. 5 shows the alternative wirelessly controlled embodiment of the remote steering apparatus 15 of the present invention. Instead of using the steering control cable 89, as shown in FIG. 1, a wireless signal 90 is employed to communicate to the remote tractor 18. The wireless controlled embodiment can utilize any conventional radio control frequency (RF), typically in the 902 MHz to 928 MHz bands, or alternatively the 2.40 GHz to 2.4835 GHz bands. Any RF band could be employed for the wirelessly controlled embodiment, such as the 433 MHz band. Also alternatively, infrared communication could be employed, or any other conventional wireless communication protocol or means.

For the wirelessly controlled embodiment of the remote steering apparatus 15, the wireless signal 90 communicates between a transmitter unit 93 preferably mounted to or alternatively housed within the remote row finder console 74 of the towed vehicle 19. The transmitter unit communicates with a receiver unit 94, preferably mounted to or alternatively housed within the steering control box 85 of the remote tractor 18. Additionally, a radio receiver output linear actuator control 96 is included within the steering control box 85. The radio receiver output linear actuator control provides proportional position control through the finder control cable 88 to extend or retract the extension actuator 39, as shown in FIGS. 2 through 4.

A preferred transmitter unit 93 is a standard and compact "controller area network protocol" (CAN) type of transmitter module. The transmitter unit is paired with the preferred receiver unit 94, which is a standard, compact CAN type of compact receiver module. The transmitter unit and the receiver unit preferably include a multiple of input and output ports, and are fully integrated. For use with the receiver unit, a preferred radio receiver output linear actuator control 96 is the "LAM722" model of proportional position controller with feedback, as manufactured by MIRATRON of Portland, Oreg. The specific transmission input and output connections and wiring for the wireless control embodiment of the remote steering apparatus 15 of the present invention can be preformed by a person skilled in the field of wireless control technologies.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A remote steering control with row finder apparatus, the apparatus comprising:
    a remote tractor for pulling a towed vehicle in a forward motion;
    the remote tractor including a steering mechanism and the remote tractor including a row finder apparatus, the row finder apparatus having a guide arm; the guide arm having an arm extension, with a pivot tab proximate to a pivot block on the arm extension, the pivot block hingeable about the arm extension at a block hinge;
    a pivot switch mounted to the arm extension of the guide arm, the pivot switch activated by the rotation of the pivot tab from the pivot switch on the pivoting of the pivot block about the guide hinge;
    a control signal generated by the pivot switch when the pivot switch is activated;
    a remote console receivable onto the towed vehicle, the remote console for controlling the steering mechanism of the remote tractor, to guide a direction of travel of the remote tractor, and the remote console for adjusting an extension length of the arm extension; and
    the pivot switch electrically connects to the remote console, and the remote console controls the steering mechanism of the remote tractor with the control signal received from the pivot switch.

2. The remote steering control of claim 1, wherein the remote console communicates wirelessly with the steering mechanism of the remote tractor.

3. A remote steering control comprising:
    a towed vehicle pulled by a remote tractor;
    the remote tractor including a guide arm, the guide arm having an arm extension;
    the arm extension including a guide block, the guide block including a guide block hinge and the guide block horizontally extendable relative to an adjacent crop row;
    a pivot block hingeable on the guide block at the guide block hinge;
    a pivot switch activated by the rotation of the hinging of the pivot block about the guide block hinge;
    a control signal generated by activation of the pivot switch;
    a remote console receivable onto the towed vehicle, the remote console for controlling the steering mechanism of the remote tractor, to guide a direction of travel of the remote tractor, and
    the remote console for adjusting an extension length of the arm; and
    the pivot switch electrically connects to the remote console, and the remote console controls the steering mechanism of the remote tractor with the control signal received from the pivot switch.

4. The remote steering control of claim 3, wherein the remote console communicates wirelessly with the steering mechanism of the remote tractor.

5. A remote steering control with row finder apparatus, the apparatus comprising:
    a towed vehicle pulled by a remote tractor in a forward motion;
    the remote tractor including a steering mechanism and the remote tractor including a row finder apparatus, the row finder apparatus having a guide arm; the guide arm having an arm extension, the arm extension having a pivot tab proximate to a pivot block on the arm extension, the pivot block hinged about the arm extension at a block hinge;
    a pivot switch mounted to the arm extension of the guide arm, the pivot switch activated by the rotation of the pivot tab from the pivot switch on the pivoting of the pivot block about the guide hinge, and a control signal generated by activation of the pivot switch;
    a remote console received onto the towed vehicle, the steering mechanism of the remote tractor controlled by the remote console, a direction of travel of the remote tractor guided by the steering mechanism, and the extension length of the arm extension of the guide arm adjustable by the remote console; and
    the pivot switch electrically connected to the remote console, the remote console controls the steering mechanism of the remote tractor with the control signal received from the pivot switch.

6. The remote steering control of claim 5, wherein the remote console communicates wirelessly with the steering mechanism of the remote tractor.

* * * * *